Inventor
Herbert Charles Anthony,

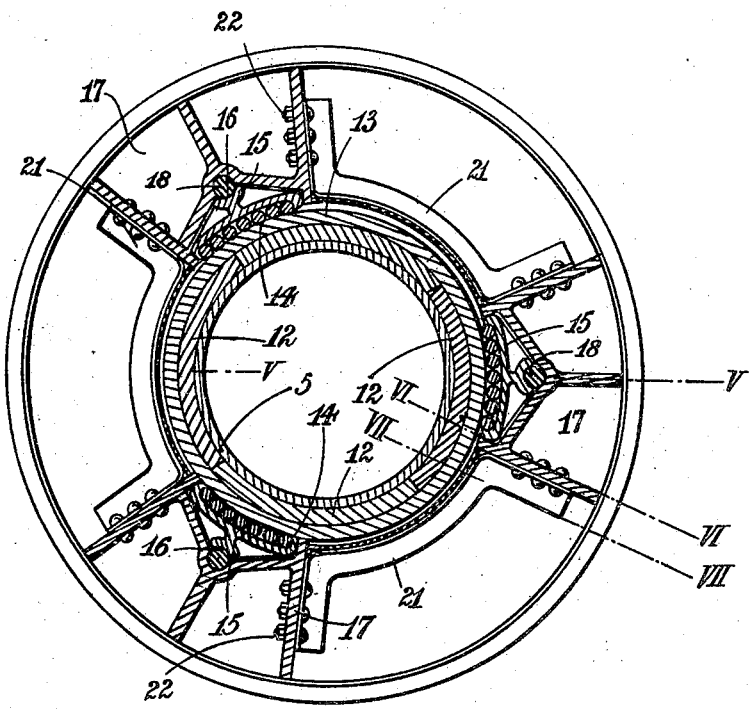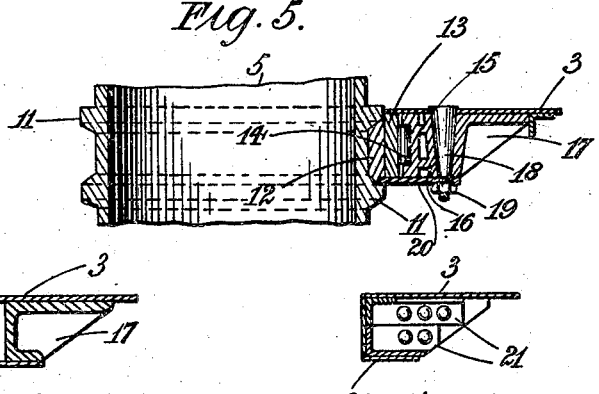

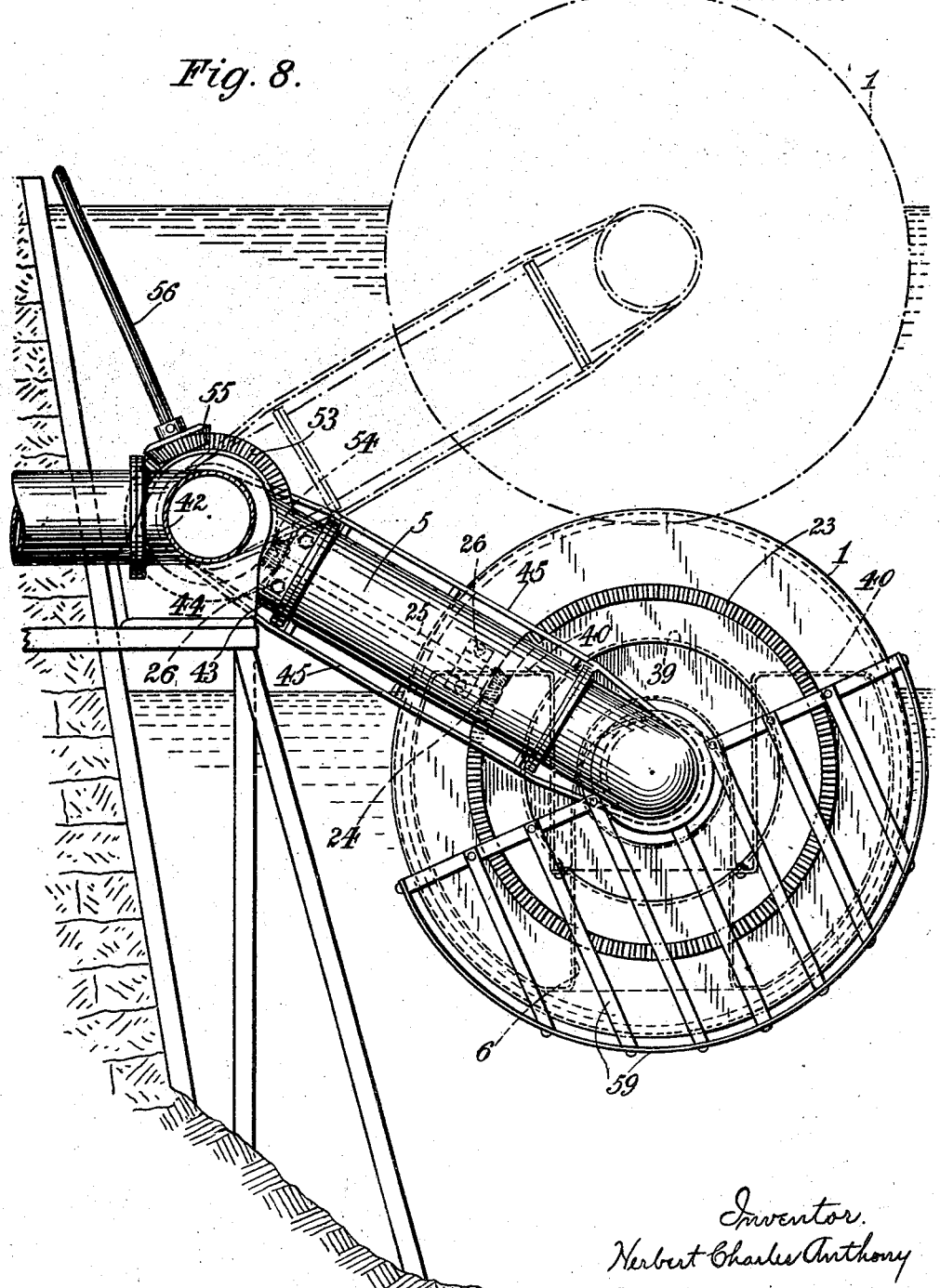

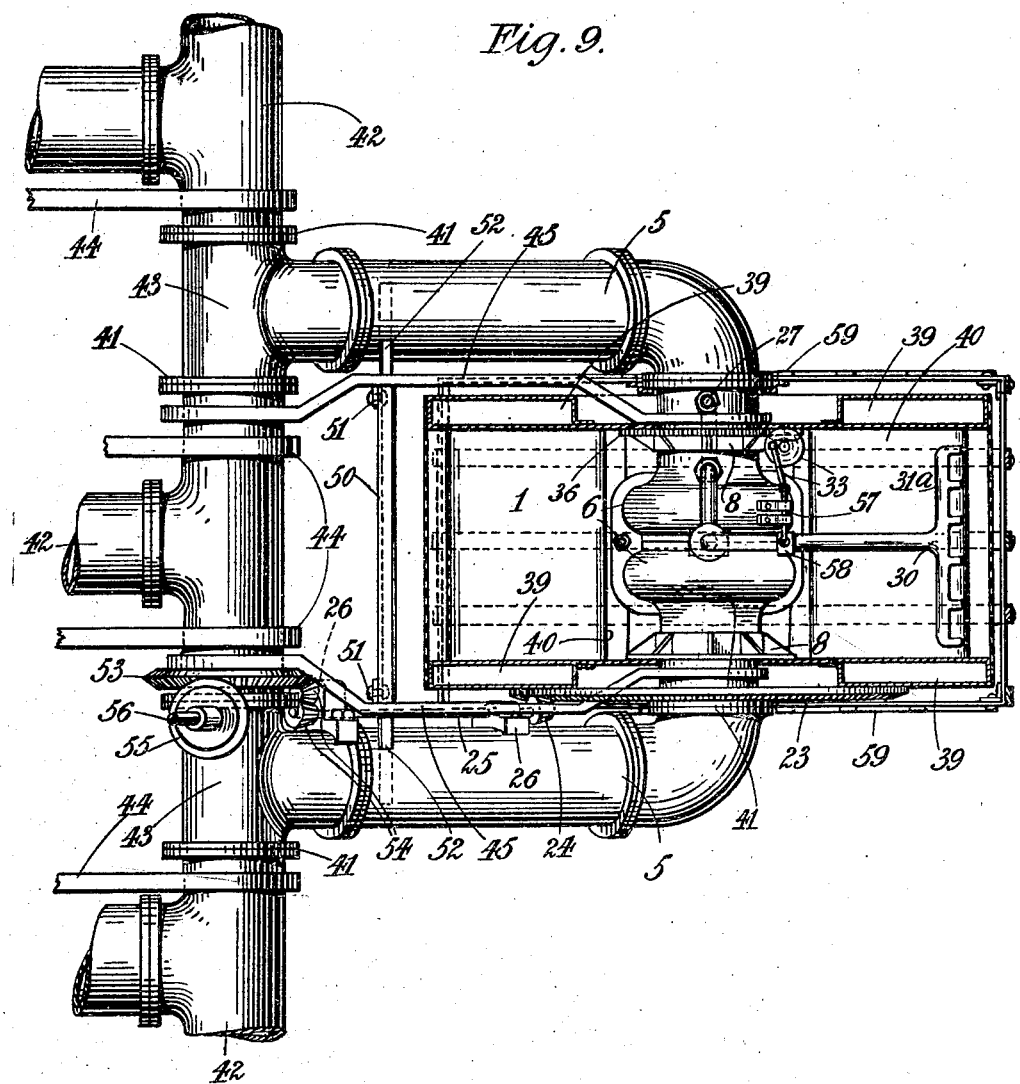

Nov. 25, 1924.
H. C. ANTHONY
1,516,693
ROTARY STRAINER
Filed April 22, 1920    6 Sheets-Sheet 6
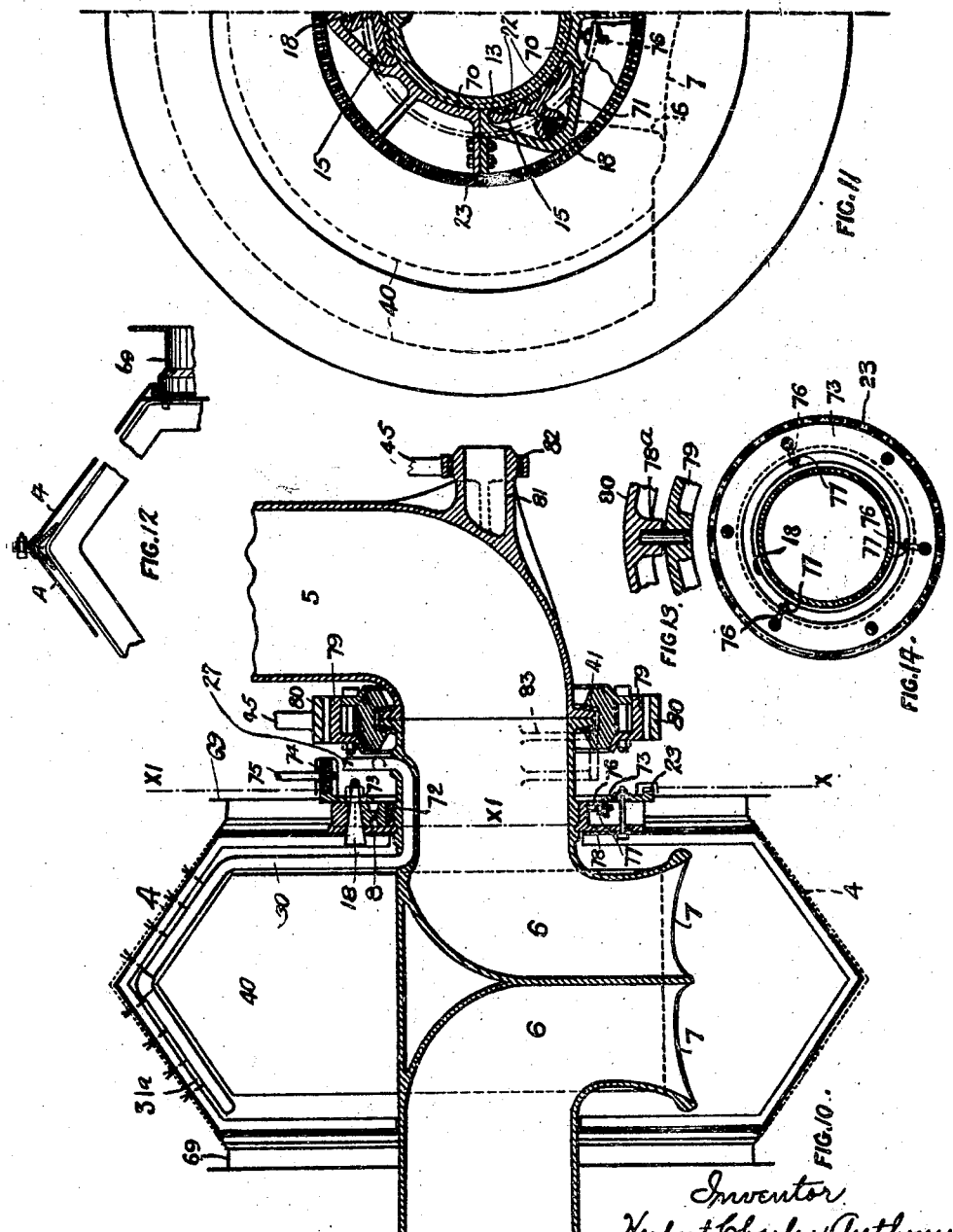

Patented Nov. 25, 1924.

1,516,693

UNITED STATES PATENT OFFICE.

HERBERT CHARLES ANTHONY, OF NEWCASTLE-UPON-TYNE, ENGLAND.

ROTARY STRAINER.

Application filed April 22, 1920. Serial No. 375,769.

*To all whom it may concern:*

Be it known that I, HERBERT CHARLES ANTHONY, a subject of the King of Great Britain, residing at Jesmond, Newcastle-upon-Tyne, Northumberland, England, have invented certain new and useful Improvements in Rotary Strainers, of which the following is a specification.

This invention comprises improvements in and connected with rotary water strainers or like filtering devices, particularly applicable for the straining of river water, which will enable an efficient flow of water to be obtained for various purposes where a relatively large supply of water is required, as for instance in the case of condensers.

Certain rotary water strainers previously employed for the above purpose, have consisted of a revoluble screen disc of which the periphery turned in a passage or guideway formed in the side of a chamber or tank from which the screened water was drawn, the surfaces of contact between the screen and guide-way forming a seal against the ingress of solid matters to the draw-off pipe. Others have consisted of an endless belt of screen plates necessitating similar guideways and seals in the sides of the chamber or tank. These types of apparatus possess the disadvantage that the passage or guideway is for the most part permanently under water and difficult of access if anything jams or chokes under water in the seal.

In other types of strainers used for separating solids from liquids, a cage or screen is caused to revolve in a chamber or tank to which the liquid with matters in suspension is admitted and from the interior of which cage the liquid is withdrawn. In this type of strainer the tank forms a receptacle for the accumulation of solid matter, which is undesirable because such solid matters become churned up and repeatedly brought against the face of the screen whereas the latter should be kept as free from solid matters as possible.

In yet other types, material to be filtered is spread over the outside of a revolving drum or screen, the interior of which is under partial vacuum which causes the liquid and air to be drawn into the drum, while the solid matters are collected from the exterior. The objection to this type of apparatus is the high obstruction to the flow of liquid into the drum owing to the extreme degree of separation, required between the solids and fluids.

Now the principal object of the present invention is to provide a rotary straining apparatus for enabling relatively large quantities of clear or screened water to be obtained from bodies of impure water such as river water, while at the same time avoiding the disadvantages referred to in connection with the above mentioned types of apparatus.

According to this invention, the rotary strainer device takes the form of a cylindrical or similarly shaped screen or cage completely enclosing the entry to the draw off pipe or pipes, the said screen being supported so as to revolve in open water without requiring a containing tank and being connected by the said pipe with suction apparatus on land. From the suction apparatus, the screened water may, for example, be pumped, and conveyed by pipe to condensers or other apparatus in which the water is required for use. The surface of contact between the revolving screen and the stationary part of the apparatus are made at bearings near the axis of the screen and which can be placed above the water level. Further the screen is suitably provided with cleaning means and is of so open a nature that the same atmospheric pressure exists on the inside as on the outside of the screen. The end or ends of the draw off pipe or pipes is or are adapted to form two bearings, on which the cylindrical screen is revolubly mounted, means being provided for effecting adjustments and for sealing the bearings against the ingress of objectionable matter to the pipe.

The strainer may be fixedly mounted on a permanent structure arranged on the river bed or shore, or may be constructed with buoyant or float chambers, or may be mounted on a float or pontoon arrangement, so that it is immersed in the water at a constant depth, relative to the surface, irrespective of the rise and fall of the water level.

The suction pipes leading from the strainer to the pump in the case of the floating construction of strainer, are constructed with suitable disposed swivel and flexible joints, so that they may hinge about an axis on or by the shore, parallel to that of the strainer while maintaining a sealed connection between the pump and the strainer during all movements of the latter.

The invention further provides means for enabling the interior of strainers of this kind to be cleaned and effectually cleared of wood, débris and any accumulated matter likely to interfere with the operation of the strainer, a jet or spray apparatus being provided for this purpose which may be adapted to traverse the portion of the strainer to be cleaned.

In order that the invention may be clearly understood, in all its details, reference is directed to the accompanying drawings, in which:—

Fig. 4 is a sectional elevation, on a larger scale, of the bearings of the strainer.

Fig. 5 is a sectional part plan of Fig. 4, the section being taken on the line V—V Figure 4.

Fig. 6 is a fragmentary section on the line VI—VI of Figure 4 and

Fig. 7 is a similar view on the line VII—VII of Figure 4.

Fig. 8 is a side elevation of a suitable construction of rotary drum strainer of the "floating" type according to this invention and Fig. 9 is a plan view but showing the drum in section.

Fig. 10 is a sectional elevation of a modified form of "floating" strainer.

Fig. 11 is a section on the line XI—XI of Fig. 10.

Fig. 12 is a detail view of the peripheral screen plates.

Fig. 13 is detail view of a swivel pin connection for the radial arms, and

Fig. 14 is a detail view of centering means for the driving wheel.

Figure 1:
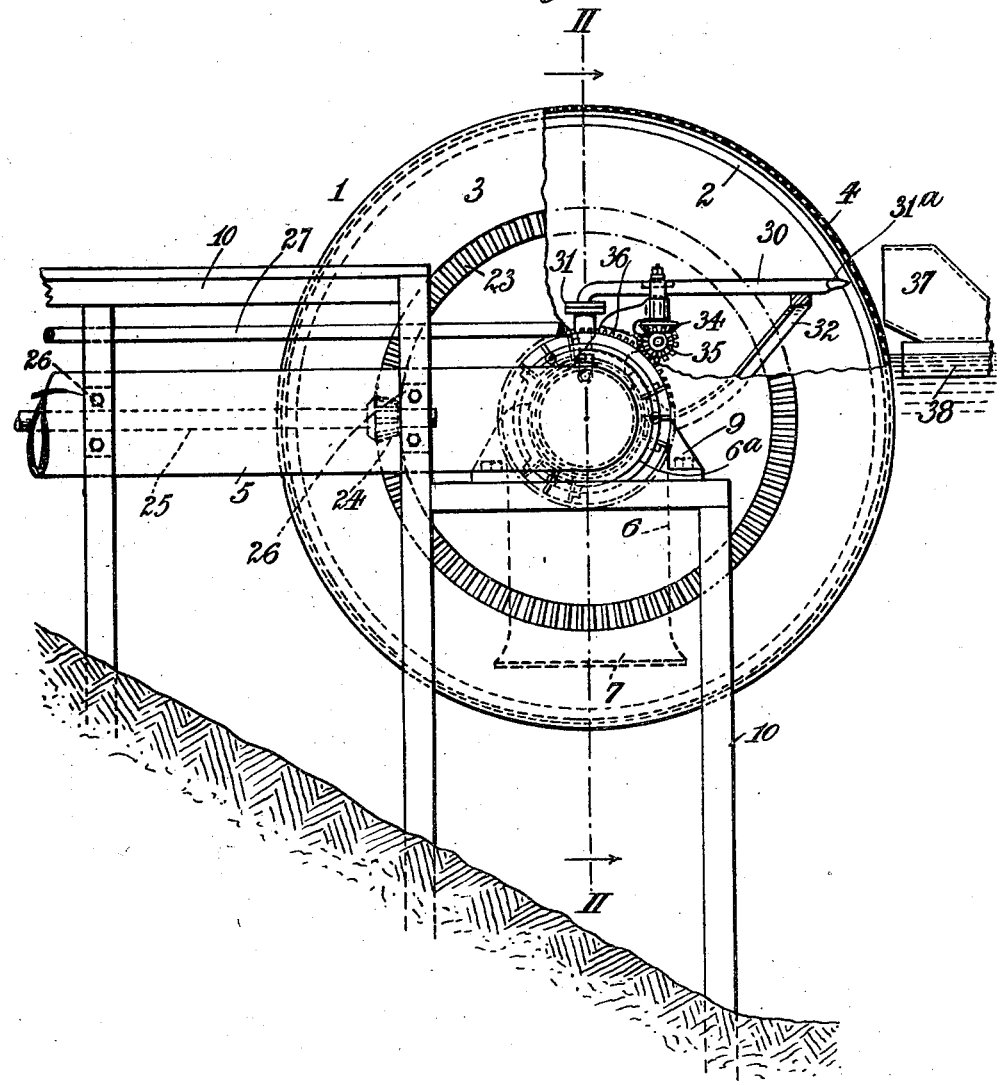
Figure 1 is a side elevation, partly in section illustrating a suitable construction of rotary drum strainer according to this invention.
Figure 2:
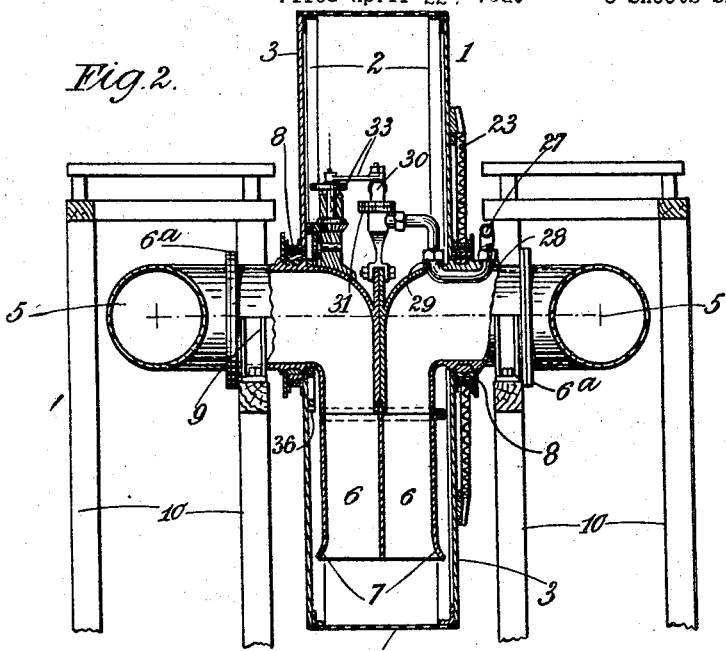
Fig. 2 is a sectional elevation, the section being taken approximately on the lines II—II of Figures 1 and 3 looking in the direction of the arrows.
Figure 3:
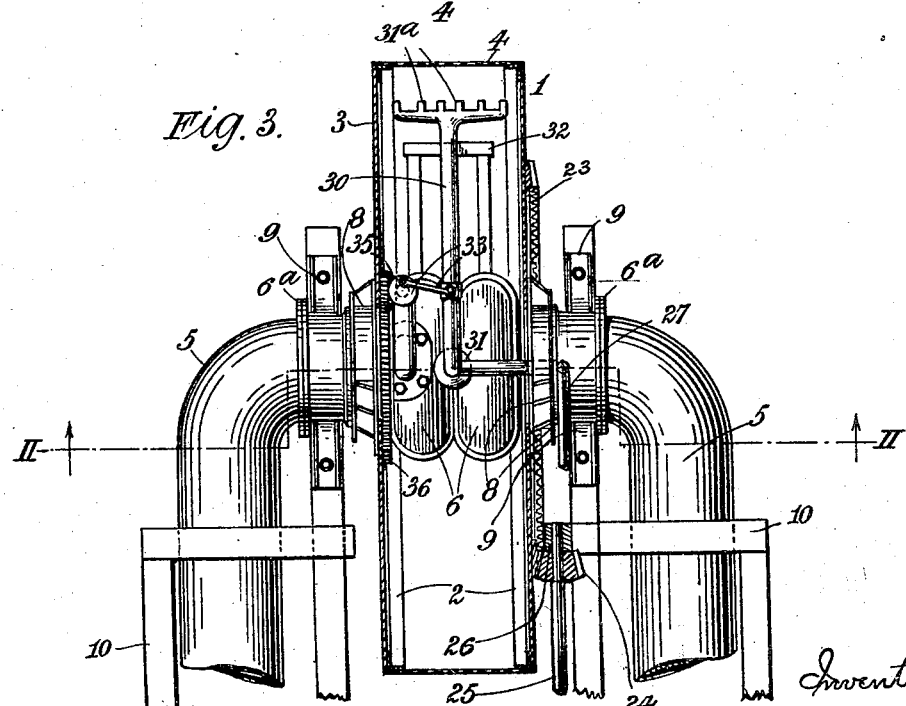
Fig. 3 is a sectional plan view.

The construction of strainer shown in Figures 1 to 3 is of the "fixed" type as distinguished from the "floating" type hereinafter described.

The strainer 1 is of cylindrical form and suitably consists of angle iron frame members 2 on which are mounted the side plates 3 and the screening or filtering portion 4, the latter suitably consisting of a series of peripheral segments or plates which are so attached to the frame members 2 that they can be readily removed or renewed at will. Pipes 5 of substantially larger diameter capable of drawing off the water and conveying it, for example to a condenser, enter the screen centrally on either side and have their ends provided with downwardly depending right-angle bends 6, the orifices being suitably flared as shown at 7. The suction pipes 6 preferably are separate members connected to the pipes 5 at the joints 6ª. By connecting the pipe 5 entering each side of the strainer 1, with a separate depending suction pipe 6 within the strainer, repairs can be made on the pipes on either side of the apparatus without necessarily putting the whole apparatus out of action.

The strainer revolves on bearings 8 which will be presently described, and the pipe bends which form the trunnions and carry the bearings 8 are supported by means of suitable brackets 9 secured to beams resting on piles driven into the river bed, the beams and piles forming a staging 10. The latter therefore acts as a support for the strainer and it also supports the draw-off pipes 5 which are led straight to the shore. The bearings 8 are suitably of the form illustrated in Figures 4 to 7 wherein it will be seen that the draw-off pipe 5 is formed with a raised boss 11 having a groove formed therein in which a series of strips 12 is fitted. Around these strips a ring 13 is placed which forms the race for the rollers 14 of the bearing. The rollers are confined in shoes 15 which have a tapered groove 16 formed on their outer side, and between these grooves and similar grooves on the shoe-containing members 17, taper pins 18 are adapted to engage, so that by adjusting the nuts 19, Figure 5, the bearing may be tightened or loosened as may be necessary. The bearings are connected together and held between the outer wall 3 of the strainer and a guard or sealing plate 20 by means of segmental members 21. By employing bolts on two opposite sides of the bearing, as shown at 22, one half of the bearing may be removed, when it is required to remove the strainer from its bearings for repairs or other purposes. If preferred, bearing blocks of lignum vitæ or other suitable material may be substituted for the rollers 14.

The strainer 1 may be revolved in any suitable manner for example by means of an annular toothed ring 23 fixed on one side of the strainer and driven through a bevel wheel 24 on a shaft 25. The latter may be mounted in brackets 26 on the staging 10 and driven from a suitable motor not shown.

In order that the screen plates 4 may be washed and kept clean and free from accumulated dirt and objectionable matter a reciprocating water jet device may be provided within the strainer 1, as shown in Figures 1 to 3. This comprises a pressure service pipe 27 which passes through watertight joints 28 and 29 in the bend portion of one of the pipes 5 as seen in Figure 2, and is supported above the centre of the interior of the strainer, where a second pipe 30 is connected therewith at one end by means of a swivel joint 31. This pipe 30 has fixed at its other end a jet or spray device 31ª which may be reciprocated upon a support 32 by means say of the crank disc and connecting rod mechanism 33 which is driven through the bevel gear 34 and combined bevel and spur wheel 35 from a toothed ring 36 mounted on the boss or side of the strainer drum. Thus it will be seen that as the strainer 1 revolves, carrying with it the toothed ring 36, the pipe 30 will be reciprocated and the jet device 31ª, therefore, moved backwards and forwards across the inner face of the peripheral screen portion 4 of the strainer so that solid matter adhering to any part of the exterior of the revolving screen 4 will be removed. A suitable trough 37 (see Fig. 1) mounted on a float 38 may be arranged in convenient proximity to the external surface of the screen to catch and lead away the matter removed by the jets. If desired, brushing or scraping devices may be combined with the reciprocatory jet devices 31ª for the purpose of breaking and cutting away any accumulated matter and of generally assisting the cleaning and clearing functions of the jet apparatus.

In the "floating" type of strainer shown in Figures 8 and 9, the construction of the strainer drum 1 is practically similar to that previously described with the exception that it is formed or provided on either side with annular float chambers 39 comprising watertight air chambers. The draw-off pipes 5 as before have their ends formed with downwardly depending suction portions 6 and two further float chambers 40 are mounted on these depending suction pipes so as not to revolve with the strainer 1. The float chambers, of course, are so designed that the strainer 1 is immersed in the water at the required level, and where the draw-off pipes issue from the strainer 1 they are adapted to form trunnions for carrying the strainer which is adapted to revolve on these trunnions through suitable bearings 8 preferably of similar construction to those previously described. The pipes 5 are in this case fitted with suitable swivel joints 41 and are connected to the shore pipe 42 through medium of T-pieces 43 also fitted with swivel joints 41. By the employment of these swivel connections the floating strainer 1 will be enabled to move freely according to the variations in water level. At the shore end the pipes 42 leading to the pumps are securely supported in any suitable manner adjacent to the swivelling T-pieces 43 leading to the strainer, for instance, by means of pedestals or brackets 44. It may be advantageous to connect several pumps with the strainer, for instance, one or two pumps may be connected to the outer side of each swivelling T-piece 43 and one to the central connection between the inner sides of the two T-pieces 43. Radial connecting arms 45 connect the trunnion portions of the pipes 5 with the shore, these radial arms being pivotally connected to the pipes by suitable bearings at both the strainer and shore ends. In order that the strainer may have freedom of movement about the horizontal axis as it floats and that the pipes 5 and radial arms 45 may be constrained to rotate in vertical planes the two pipes 5 and also the radial arms 45 may be connected by means of lateral stays 50 which are pivotally connected to the arms 45 at 51 and are connected to the pipes 5 through brackets 52 (see Figure 9). The strainer may be revolved in a manner similar to that shown in Figures 1 to 3 that is by means of a circular toothed ring 23 on the side of the strainer and a bevel gear 24 on the shaft 25. The latter is mounted in brackets 26 arranged on the appropriate draw-off pipe 5 or it may be on the appropriate radial arm 45, but instead of receiving motion directly from a motor on shore, the shaft is suitably driven by an annular bevel toothed ring 53 revolubly mounted on the shore hinge pipe and suitably driving the shaft 25 through bevel gears 54, the ring 53 being driven by a bevel gear 55 on a shaft 56 which is driven from the motor (not shown). The screen plates are washed and kept clean by spraying devices similar to those shown in Figures 1 to 3 but in this case for the sake of convenience the crank disc and connecting rod mechanism 33 which reciprocates the jet device 31ª is connected to a slider rod 57 attached with a loose connection 58 to the pipe 30. The pressure service pipe 27 is suitably led into the strainer along one of the radial arms 45 and of course, would be provided with swivel joints where necessary to allow it to move therewith. An external trough similar to the trough 37 aforesaid, would also suitably be employed for leading away the matter removed from the screen plates although this trough is not illustrated in Figures 8 and 9.

In order to prevent any floating débris from coming into contact with the revolving filter a rough cage or guard 59 of wood, iron or other suitable material may be attached to the draw off pipes 5 or otherwise applied to the strainer and such a guard could be applied to any form of rotary filter herein described.

Figures 10 and 11 show a further form of "floating" strainer in which the peripheral screen plates 4 are inclined from the centre outwardly to both sides of the filter, thus giving a maximum area for filtering purposes and an inclined surface to render easier the removal of adherent matter. Around the periphery is arranged an annular gutter 69, shown in detail in Figure 12, to collect and guide away the detached matter.

The filter is supported on bearings 8 which in this case are shown as having a somewhat different construction from that previously described, the casing 70 being made in two halves, which halves carry the bearing shoes 15 in recesses 71, the shoes 15 being adjustable as before by means of taper bolts 18. The shoes 15 are shown as fitted with lignum vitæ or other solid bearing material 72, but they may of course be roller bearings as hereinbefore described. The outer plate 73 of the bearing has fixed or formed thereon the driving gear wheel 23 which is driven from the shore through the gear wheel 74 and shaft 75. The plate 73 and its gear wheel 23 are suitably made adjustable by means of the arrangement shown in Figure 14, which comprises three adjusting bolts 76 fixed to a flange on the plate 73 and bearing on the boss part 78 of the bearing, so that by adjusting these bolts 76 and thereafter securing the lock nuts 77 the driving gear wheel 23 may be accurately centered. Swivel joints 41 are provided to which the radial arms 45 from the shore are attached, through the medium of pivot joints shown in detail in Figure 13, pins 78$^a$ fixed diametrically oppositely in the outer ring 79 of the swivel bearing engaging holes in the ring 80 to which the radial arms 45 are attached. Attached to the outer bend of the pipe 5 is a projection or bracket 81 to which an outer radial arm 45 is attached through a spherical bearing 82. Similar hub bearings 8, swivel joint 41, and spherical bearings 82 are of course provided on the other side of the filter, although omitted in the drawing. Suitable jet devices 31$^a$ are also employed which are fed through pipes 27 and 30 from any suitable water supply.

A float chamber 40 is provided which is attached over the suction pipes 6, as shown, although, of course this form of filter device may be employed as a fixed type in which case the float chamber 40, swivel and spherical joints will be omitted and the filter supported on convenient brackets such as shown in dotted lines at 83.

I claim:—

1. A rotary strainer comprising in combination, a screen or cage of the drum type, means for supporting the screen in open water, a draw-off pipe leading from the screen at one side and having its entry completely enclosed by the screen, the pipe being capable of delivering relatively large quantities of screened water to suction apparatus on land, bearings on the draw-off pipe for the revoluble mounting of the screen, and driving mechanism operative to revolve the screen, the said screen having a screen surface of so open a nature that the same atmospheric pressure exists in the inside as on the outside of the screen during the operation thereof, substantially as set forth.

2. Rotary strainer comprising a cylindrical screen, buoyant means connected therewith, a suction pipe having its open end enclosed by said screen, jointing in said pipe permitting rise and fall of said screen, a revoluble mounting for said screen, and driving mechanism operative to revolve said screen.

3. Rotary strainer comprising a cylindrical screen, float chambers associated therewith, a suction pipe having its open end enclosed by said screen, jointing in said pipe permitting rise and fall of said screen, a revoluble mounting for said screen comprising a bearing on said suction pipe, and driving mechanism operative to revolve said screen.

4. Rotary strainer comprising a cylindrical screen, buoyant means connected therewith, a suction pipe having its open end enclosed by said screen, pivotal jointing in said pipe having the pivot axis parallel with the axis of said screen, a revoluble mounting for said screen, and driving mechanism operative to revolve said screen.

5. Rotary strainer comprising a cylindrical screen, buoyant means connected therewith, a suction pipe having its open end enclosed by said screen, pivotal jointing in said pipe permitting rise and fall of said screen, a radius arm pivotally connected at said joint and at the axis of said screen, a revoluble mounting for said screen, and driving mechanism operative to revolve said screen.

6. A rotary water strainer comprising a cylindrical screen, a draw off pipe or pipes leading from said screen at the side and having the suction end enclosed by the screen, a revoluble mounting for said screen, driving means operative to revolve the screen, and jet mechanism mounted on the draw-off pipe or pipes for supplying a cleansing jet interiorly of the screen, substantially as set forth.

7. A rotary water strainer comprising a cylindrical screen, a draw-off pipe or pipes leading from said screen at the side and having the suction end enclosed by the screen, a revoluble mounting for said screen, driving means operative to revolve the screen, jet mechanism mounted pivotally on the draw off pipe, or pipes, and means for oscillating the jet substantially as and for the purpose set forth.

8. Rotary strainer comprising a cylindrical screen, composed of a framework and peripheral screen plates mounted at an inclination to the axis of rotation, a suction pipe having its open end enclosed by said strainer, a revoluble mounting for said strainer, driving means operative to revolve said strainer, and a peripheral gutter affixed to said strainer at the smaller diameter of said screen, substantially as set forth.

9. A rotary strainer comprising a revoluble cylindrical screen having screen plates mounted at an angle to the axis of rotation, a suction pipe having its open end enclosed by said screen, and an annular gutter on said screen for receiving and guiding away matter detached from the screen plates, substantially as set forth.

HERBERT CHARLES ANTHONY.